(No Model.)
I. KITSÉE.
VOLTAIC BATTERY.
No. 400,224. Patented Mar. 26, 1889.
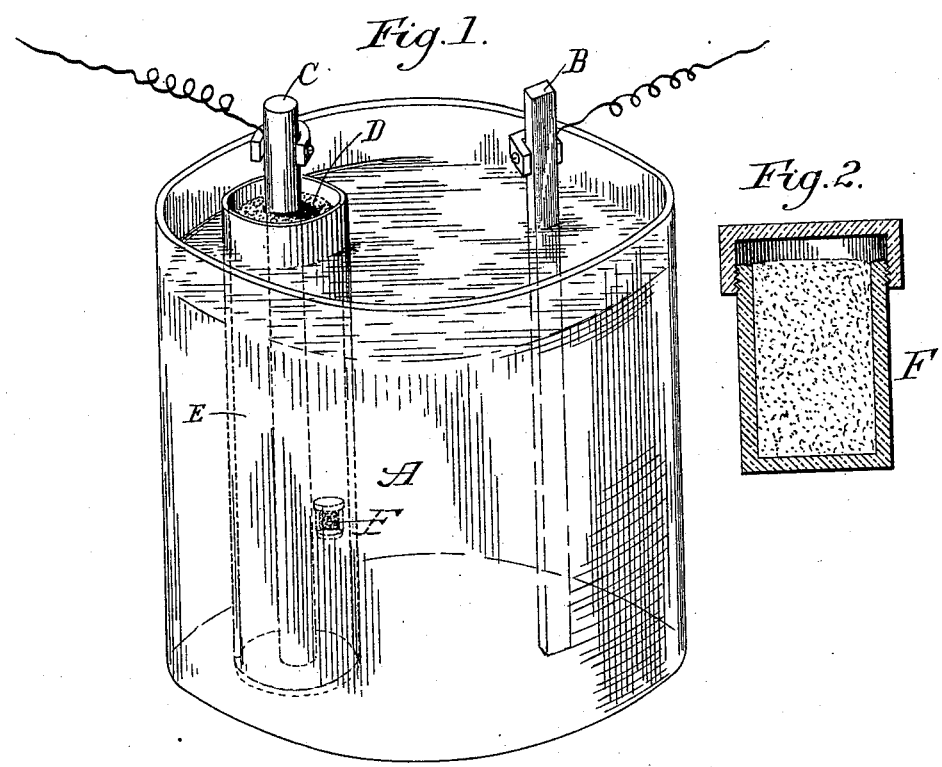
WITNESSES.
R. B. Shepherd.
F. Norman Dixon.
Isidor Kitsée
INVENTOR
By his Attorneys,

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

VOLTAIC BATTERY.

SPECIFICATION forming part of Letters Patent No. 400,224, dated March 26, 1889.

Application filed April 19, 1888. Serial No. 271,208. (No model.)

*To all whom it may concern:*

Be it known that I, ISIDOR KITSEE, of the city of Cincinnati, and State of Ohio, have invented an Improvement in Voltaic Batteries, of which the following is a specification.

My invention relates to a voltaic battery, and particularly to that class of voltaic batteries known as open-circuit batteries, a well known type of which is the so called Leclanché battery, which consists essentially of a jar containing a solution of chloride of ammonia, in which solution is immersed a zinc, or positive element, and a carbon or negative element contained in a porous cup, the latter element being sometimes surrounded with a conglomerate of fragments of carbon and crystals of per-oxide of manganese.

In the drawings, Figure 1 is a view in perspective of a Leclanché battery, and Fig. 2 a sectional elevation of a porous capsule containing bisulphate of mercury.

A is the containing cup; B the zinc or positive element; C the carbon or negative element, D the carbon and per-oxide of manganese conglomerate with which the carbon, or negative, element is shown surrounded, and E the porous cup.

F is a porous capsule containing bisulphate of mercury.

The object of my invention is to provide a battery by which a current of electricity of high electro-motive force is produced, in which the resistance is decreased and the ampère increased, in which the tendency of the carbon, or negative, element to become polarized is lessened, and in which the zinc, or positive, element is amalgamated and thereby prevented from being attacked or corroded by the battery fluid.

My invention comprehends the employment, in a voltaic battery cell, of a solution of chloride of ammonia, or of chloride of soda, or of other chloride, bisulphate of mercury, and positive and negative elements immersed in said solution.

In the operation of a battery embodying my invention the presence of bisulphate of mercury, in a chloride solution, prevents the formation of chloride of zinc crystals on the zinc or positive element of the battery, and it causes the formation of chlorate of sulphate of zinc which is precipitated to the bottom of the battery cell; the liberated oxygen of the sulphuric acid of the bisulphate of mercury combining with the hydrogen liberated in chemical action of the battery and preventing the deposition of hydrogen upon the carbon or negative element thereof and the consequent polarization of said element.

It will be understood that a battery embodying my invention may be formed by combining bisulphate of mercury and chloride of ammonia or other chloride as above described. It will also be understood that bisulphate of mercury may be added to any battery the fluid of which contains chloride of soda or other chloride, in which, in the operation of said battery, chloride of zinc crystals have been formed upon the zinc, or positive element, and in which globules of hydrogen have been deposited on the carbon, or negative element, and said negative element been thereby polarized, with the result that the chloride of zinc crystals formed upon the zinc element of the battery will be dissolved, metallic mercury be formed and amalgated with the zinc element, chloride of sulphate of zinc be formed, and precipitated to the bottom of the battery cell, and the liberated oxygen of the sulphuric acid of the bisulphate of mercury be combined with the hydrogen upon the surface and in the pores of the carbon element, and the battery be restored to an active condition.

Bisulphate of mercury may be inclosed in porous capsules of proper size which may be readily supplied to a battery cell containing a chloride, to prevent the polarization of its negative element, or to restore the vitality of the battery.

It will be understood that my invention may be embodied in a battery of the type known as the Leclanché battery, when said battery consists of zinc and carbon elements immersed in a solution of chloride of ammonia, and also in a battery of that description when the carbon element is surrounded with a conglomerate of scraps of carbon and crystals of per-oxide of manganese.

Having thus described my invention, I claim:—

1. In a voltaic battery cell, in combination, a solution of chloride of ammonia, or of chloride of soda, or of other chloride, bisulphate of mercury, and positive and negative elements immersed in said solution, as specified.

2. In a voltaic battery cell, in combination, a solution of chloride of ammonia, or of chloride of soda, or of other chloride, bisulphate of mercury, contained in a porous capsule, and positive and negative elements immersed in said solution, as specified.

3. In a voltaic battery cell, in combination, a battery fluid, a porous capsule immersed in the fluid in the porous cup in which the negative element is contained and provided with material to prevent the polarization of said element or to restore the vitality of said fluid, as specified.

In testimony that I claim the foregoing as my invention I have hereunto signed my name this 2d day of April, A. D. 1888.

ISIDOR KITSEE.

In presence of—
WM. C. STRAWBRIDGE,
F. NORMAN DIXON.